US012432052B2

United States Patent
Suriyanarayanan et al.

(10) Patent No.: US 12,432,052 B2
(45) Date of Patent: Sep. 30, 2025

(54) SYSTEM AND METHOD FOR VALIDATING AN INTERACTION USING AN AGREEMENT KEY

(71) Applicant: Bank of America Corporation, Charlotte, NC (US)

(72) Inventors: Gowri Sundar Suriyanarayanan, Chennai (IN); Maneesh Kumar Sethia, Hyderabad (IN); Abhijit Behera, Hyderabad (IN); Shailendra Singh, Thane West (IN)

(73) Assignee: Bank of America Corporation, Charlotte, NC (US)

( * ) Notice: Subject to any disclaimer, the term of this patent is extended or adjusted under 35 U.S.C. 154(b) by 191 days.

(21) Appl. No.: 18/479,493

(22) Filed: Oct. 2, 2023

(65) Prior Publication Data

US 2025/0112767 A1    Apr. 3, 2025

(51) Int. Cl.
*H04L 29/06* (2006.01)
*H04L 9/00* (2022.01)
*H04L 9/06* (2006.01)
*H04L 9/08* (2006.01)

(52) U.S. Cl.
CPC ............ *H04L 9/0866* (2013.01); *H04L 9/008* (2013.01); *H04L 9/0643* (2013.01); *H04L 9/50* (2022.05)

(58) Field of Classification Search
None
See application file for complete search history.

(56) References Cited

U.S. PATENT DOCUMENTS

| | | |
|---|---|---|
| 10,861,016 B2 | 12/2020 | Ma |
| 11,005,665 B2 | 5/2021 | Lu |
| 11,017,392 B2 | 5/2021 | Kumnick et al. |
| 11,037,164 B2 | 6/2021 | Lin |
| 11,063,759 B2 | 7/2021 | Kocsis et al. |
| 11,232,442 B2 | 1/2022 | Liu et al. |
| 11,276,060 B2 | 3/2022 | Qi |
| 11,410,214 B2 | 8/2022 | Tardiou |
| 11,526,938 B2 | 12/2022 | Nugent |
| 11,538,070 B2 | 12/2022 | Taudes |
| 11,665,000 B2 | 5/2023 | Duan |

(Continued)

FOREIGN PATENT DOCUMENTS

CN         1797500 B  *  6/2010  ........... H04L 9/3236
WO   WO-2017207680 A1 * 12/2017  ............. G06F 21/35

*Primary Examiner* — Andrew J Steinle

(57) ABSTRACT

A system includes a memory and a processor that validates an interaction between an initiating and a receiving device. An encrypted request is received to perform the interaction and the processor extracts an initiating device identification, a receiving device identification, and one or more numerical values associated with the interaction. Using this extracted information, the processor produces a verification key by applying a hash function and a verification checksum value using a checksum function. The verification key and verification checksum value are then compared with an authentication key and authentication checksum value that were produced in a same manner prior to the interaction being initiated. If it is determined that either the verification key and the authentication key do not have the same value, or verification checksum value and authentication checksum value do not have the same value, then the interaction is reversed.

20 Claims, 2 Drawing Sheets

(56) References Cited

U.S. PATENT DOCUMENTS

| | | |
|---|---|---|
| 2020/0304290 A1 | 9/2020 | Coulmeau et al. |
| 2021/0042740 A1 | 2/2021 | Chen et al. |
| 2021/0250177 A1* | 8/2021 | Yoo .................. G16Y 40/50 |
| 2021/0273780 A1 | 9/2021 | Crintea et al. |
| 2021/0273787 A1 | 9/2021 | Leng et al. |
| 2021/0385084 A1 | 12/2021 | Riveret et al. |
| 2023/0113896 A1 | 4/2023 | Milazzo et al. |
| 2023/0136446 A1 | 5/2023 | Burchard et al. |

* cited by examiner

SYSTEM AND METHOD FOR VALIDATING AN INTERACTION USING AN AGREEMENT KEY

TECHNICAL FIELD

The present disclosure relates generally to computational systems, and more specifically to a system and method for validating an interaction using an agreement key.

BACKGROUND

Existing computer systems for performing interactions between two entities are difficult to secure and often subject to tampering. When these interactions have significant consequences, increasingly sophisticated attacks may be deployed to intercept or otherwise tamper with the interactions. The existing approaches to address these evolving attacks often result in slowing the completion of the interactions, false positives, and/or are simply ineffective.

SUMMARY

The system and method disclosed in the present application provides a technical solution to the technical problems discussed above by providing the capability to verify electronic interactions such as, but not limited to, a smart contract recorded on a blockchain. The system and method attempt to prevent the interactions from being completed when the interactions may have been tampered with. Prior to performing the interaction, an initiating device and a receiving device exchange key information about the interaction and the devices. This information is securely stored and when the interaction is initiated, the same key information may then be extracted from the interaction. This key information may then be compared with the information that was exchanged prior to the interaction being performed. If the information matches, then the interaction may be completed and recorded. However, if the information does not match, then this is an indication that the interaction has been tampered with and the interaction may then be reversed and/or not allowed to be completed. By using this method of verification along with encryption such as, but not limited to, homographic encryption, an interaction may be made more secure and difficult for bad actors to successfully tamper with.

The disclosed system provides several practical applications which include: (a) a process that verifies that an interaction has not been tampered with in a way that does not necessarily require a complete knowledge of the interaction; (b) a way to perform the verification while keeping the interaction and any related requests encrypted throughout the process; and (c) automatically, without human interaction, sending notifications that reverse the interaction when tampering is detected; quickly reducing damage while allowing other actions to be made to prohibit future tampering. This approach provides better resource utilization and a higher throughput compared to existing approaches while still being able to mitigate or eliminate interactions that have become fraudulent.

In one embodiment, the disclosed system includes a memory configured to store at least an authentication key and an authentication checksum value. The system further includes a processor that is configured to receive a request to perform an interaction between an initiating device and a receiving device. The request as well as the interaction is encrypted, and the processor is configured to extract, from the request, information that includes at least an initiating device identification, a receiving device identification, and one or more numerical values associated with the interaction. The processor produces a verification key from the information by applying a hash function to a sum of the initiating device identification, the receiving device identification, and one or more numerical values. The processor also produces a verification checksum value from the information by applying a checksum function to a sum of initiating device identification, the receiving device identification, and the one or more numerical values. The processor then compares the verification key with the authentication key to determine if they have the same value. The processor also compares the verification checksum value and the authentication checksum value to determine if they have the same value. Once this determination is made the interaction is reversed when either the verification key does not have the same value as the authentication key, or the verification checksum value does not have the same value as the authentication checksum value.

The request and the interaction are encrypted, and the system retrieves the information and performs comparisons without decrypting the request. In some embodiments the request is encrypted using homomorphic encryption which allows some information to be extracted while not exposing the entirety of the information. In one embodiment, the authentication key and authentication checksum may be produced prior to the initiating using public and/or private keys to exchange information. The authentication key and authentication checksum as well as the verification key and verification checksum are produced using the SHA256 hash functions and SHA256 checksum functions, respectively.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System Configured to Determine Whether to Validate an Interaction, Overview

Figure 1:
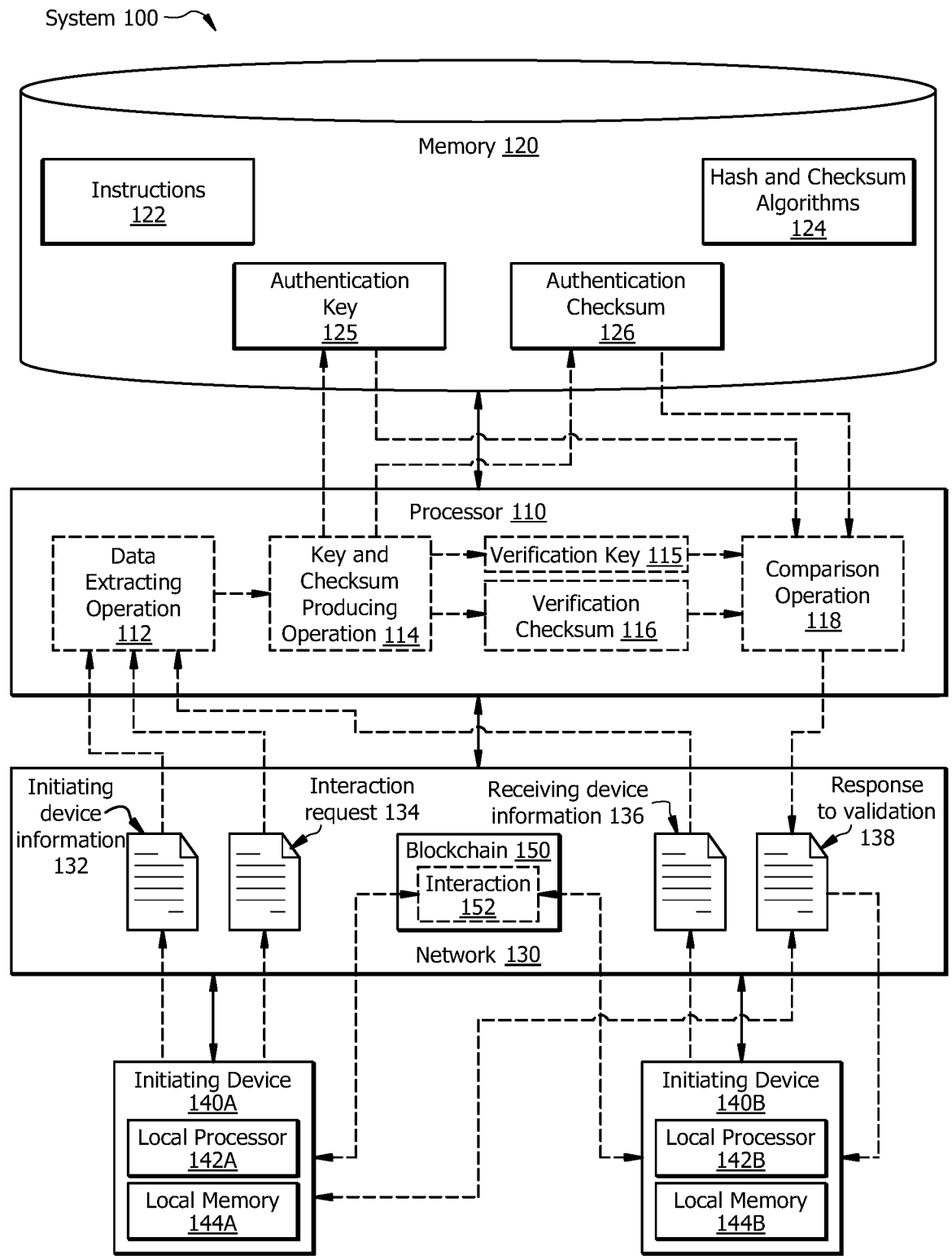
FIG. 1 illustrates one embodiment of a system configured to determine whether to validate an interaction.

FIG. 1 is a schematic diagram of a system 100 configured to determine whether to authorize an interaction 152, wherein the interaction 152 is an electronic interaction between an initiating device 140A and receiving device 140B. More specifically, the system 100 is configured to have an initiating device 140A, a receiving device 140B, or other entity send an interaction request 134 which is received by a processor 110. The processor 110 performs a data extracting operation 112 on the interaction request 134 without decrypting the interaction request 134, and using the extracted data performs a key and checksum producing operation 114 to produce a verification key 115 and verification checksum 116. The processor 110 then performs a comparison operation 118 using the verification key 115 and verification checksum 116 and an authentication key 125 and authentication checksum 126 that was previously produced and/or stored in the memory 120. The processor 110 then sends, using the results of the comparison operation 118, a response to the initiating device 140A and receiving device 140B, which either indicates that the interaction 152 is validated when the authentication key 125 and authentication checksum 126 are the same as the verification key 115 and verification checksum 116 respectively, or if they are not the same the response to validation 138 indicates that the interaction 152 is to be invalidated. The response to validation 138 is received by both the initiating device 140A and receiving device 140B which either completes the interaction 152 when it is validated or reverses the interaction 152 when it is determined to be invalid by the processor 110.

In one embodiment, the system 100 comprises a processor 110 and a memory 120 that are in signal communication with an initiating device 140A and a receiving device 140B and connected through a network 130. The system 100 may be configured as shown or in any other suitable configuration.

Network

The network 130 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 130 may be configured to support any suitable type of communication protocol as would be appreciated by one of ordinary skill in the art.

In one embodiment, the network 130 may host a blockchain 150 where the interaction 152 such as a smart contract is recorded. The blockchain 150 generally is an open, decentralized and distributed digital ledger consisting of records called blocks that are used to record transactions across many nodes (not shown) connected through the network 130. Each node of the blockchain 150 may maintain a copy of the ledger. Logically, a blockchain 150 is a chain of blocks which contain specific information. Once recorded, the data in any given block cannot be altered retroactively without alteration of all subsequent blocks, which requires consensus of the majority of the nodes connected to the network 130. Each node (not shown) connected to the network 130 forming the blockchain 150 maintains, approves, and updates new entries. The system is controlled not only by separate nodes, but by everyone associated with the blockchain 150. Each node or member ensures that all records and procedures are in order, which results in data validity and security. Thus, the blockchain 150 may record transactions between two parties, such as the initiating device 140A and receiving device 140B, in a verifiable and permanent way. By design, a blockchain 150 is resistant to modification of the data stored within.

In one embodiment the blockchain 150 hosts and/or records the interaction 152. Interaction 152 is designed to be difficult to be altered and may be encrypted using homomorphic encryption so that aspects of the interaction 152 needed for verification and validation are accessible, while other sensitive information is encrypted.

The interaction 152, in a non-limiting example, may take the form of a smart contract. A smart contract is a computer program or transaction protocol that is intended to automatically execute, control, or document events and actions according to the terms of the smart contract. The interaction 152 in the form of a smart contract is a collection of code and data that is deployed using cryptographically signed transactions on the blockchain 150.

Initiating and Receiving Devices

Examples of the initiating device 140A and receiving device 140B include, but are not limited to, computers, laptops, mobile devices (e.g., smart phones or tablets), servers, clients, automated teller machines (ATM), point of sale devices (POS), or any other suitable type of devices that may be used to initiate and complete an interaction 152. The initiating device 140A and receiving device 140B each include at least one local processor 142A and 142B that performs one or more processes or operations, including but not limited to sending to the processor 110 through the network 130 initiating device information 132, receiving device information 136, and an interaction request 134. The initiating device 140A and receiving device 140B also receive a response to validation 138 from the processor 110 through the network 130.

The initiating device 140A and receiving device 140B may each also include at least one local memory 144A and 144B for storing instructions for producing initiating device information 132, receiving device information 136, and an interaction request 134, as well as data and instructions related to the interaction 152 itself. The local memory 144A and 144B may store other data and instructions related to the operations of the initiating device 140A and receiving device 140B and is not limited to above-described instructions and data.

While FIG. 1 shows the initiating device 140A and receiving device 140B each including a single local processor 142A and 142B and a single local memory 144A and 144B, they may include any suitable number and combination of local processors 142A and 142B and local memories 144A and 144B as well as any other necessary components; with only one local processor e.g., 144A and one local memory e.g., 144A being shown in FIG. 1 for simplicity.

The initiating device 140A and receiving device 140B are configured to perform one or more different interactions 152, which are electronic, and which may be recorded on the blockchain 150 or may be performed over the network 130 using other devices or systems. The interaction 152 is an electronic interaction and may be performed with minimal or no human interaction. Some exemplary interactions 152 are or a combination of: smart contracts, processing a payment, processing a credit card or debit card, ordering a product, dispensing a product, allowing access to a resource such as, but not limited to, an internet page, secure documents, and/or other resources.

When an interaction 152 is initiated between the initiating device 140A and receiving device 140B, at least an interaction requests 134 is sent through the network 130 to the processor 110. If no authentication key 125 and authentication checksum 126 have been established in the memory 120 yet, the initiating device 140A and receiving device 140B send initiating device information 132 and receiving device information 136 to the processor 110 to produce the authentication key 125 and authentication checksum 126. Alternatively, the initiating device 140A and receiving device 140B may communicate the initiating device information 132 and receiving device information 136 directly with each other or to each other over the network 130 and calculate the authentication key 125 and authentication checksum 126 without the processor 110; providing the processor 110 and/or memory 120 the authentication key 125 and authentication checksum 126 at a later time or with the interaction request 134.

The initiating device information 132, interaction request 134, and receiving device information 136 contains such information as information related to the initiating device 140A, receiving device 140B, and one or more numerical values related to the interaction 152, such as but not limited to, an amount, or an address. The initiating device information 132, interaction request 134, and receiving device information 136 may contain more information without departing from the disclosure.

The initiation device information 132 and receiving device information 136 may be encrypted using public and private key encryption or other forms of encryption. The interaction request 134 may be encrypted using homomorphic encryption in order to protect details of the interaction 152, while allowing verification key 115 and verification checksum 116 to be calculated as will be described below.

After processor 110 performs various operations as will be described below and with regards to the method shown in FIG. 2, the processor 110 sends a response to validation 138 back to the initiating device 140A and receiving device 140B. This response to validation 138 may be an indication that the interaction 152 is valid and the interaction 152 should proceed or it may be an indication that the interaction 152 is invalid. If the response to validation 138 indicates that the interaction 152 is invalid, the interaction 152 is halted or where this is not practical, such as on a blockchain 150, the interaction 152 is reversed by the initiating device 140A and receiving device 140B or by some other outside device or process connected to the network 130, including, but not limited to, the processor 110.

Processor

The processor 110 receives initiating device information 132, receiving device information 136 and interaction request 134 from the initiating device 140A and receiving device 140B through the network 130 and after performing one or more operations, processor 110 determines if the interaction 152 should be validated. The processor 110 may take the form of any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 110 may be a programmable logic device, a microcontroller, a microprocessor, or any suitable combination of the preceding. The processor 110 is communicatively coupled to and in signal communication with the memory 120. The one or more processors making up the processor 110 are configured to process data and may be implemented in hardware or software. For example, the processor 110 may be 8-bit, 16-bit, 32-bit, 64-bit or of any other suitable architecture. The processor 110 may include an arithmetic logic unit (ALU) for performing arithmetic and logic operations, processor registers that supply operands to the ALU and store the results of ALU operations, and a control unit that fetches instructions 122 from memory 120 and executes them by directing the coordinated operations of the ALU, registers and other components.

The processor 110 is in operative communication with the memory 120. The processor 110 is configured to implement various instructions 122 stored in the memory 120. The processor 110 may be a special purpose computer designed to implement the instructions 122 and/or functions disclosed herein. For example, the processor 110 may be configured to perform the operations of the methods described in FIG. 2.

Additionally, the processor 110 executes instructions 122 to perform a series of one or more operations such as those discussed below with regards to the method of FIG. 2 on the interaction request 134. The processor 110 uses the one or more hash and checksum algorithms 124 and authentication key 125 and authentication checksum 126 stored in the memory 120 to perform various operations such as, but not limited to data extracting operation 112, key and checksum producing operation 114, and comparison operation 118, and any other operations needed for processing the interaction request 134 and/or interaction 152. The processor 110 may perform more or less operations than shown in FIG. 1, and the specific operations shown are only examples. While a single processor 110 is shown, the processor 110 may include a plurality of processors or computational devices. The algorithms 124 and/or other operations described herein as being performed by the processor 110 may be performed by a separate processor or software application executed on a single computational device e.g., processor 110, or they may be located on separate servers and/or even separate datacenters such as a cloud server and/or the initiating device 140A and receiving device 140B.

Initially, if an authentication key 125 and authentication checksum 126 has not been previously stored in the memory 120, the processor 110 receives initiating device information 132 and receiving device information 136 from the initiating device 140A and receiving device 140B. The processor 110 performs a data extracting operation 112, to extract such information as the identification, network address, machine identification number, or internet address of initiating device 140A and receiving device 140B. The data extraction operation 112 also extracts at least one numerical value related to the proposed interaction 152, such as transaction value or values or IDs related to third party devices that are involved in the interaction 152. The data extracted by the operation 112 is not limited to the above-described data and may be any sort of data that is needed or useful to produce the authentication key 125 and authentication checksum 126.

Once the processor 110 performing the data extracting operation 112 extracts all the data needed, the processor 110 performs the key and checksum producing operation 114 using the information extracted from the initiating device information 132 and receiving device information 136. The processor 110 retrieves the appropriate hash and checksum algorithms 124 from the memory 120 and uses them to produce the authentication key 125 and authentication checksum 126. In one embodiment this operation performs a SHA256 has function to produce the authentication key 125 and a SHA256 checksum function to produce the authentication checksum 126. The SHA256 is a cryptographic hash function that is a member of the secure hash algorithm (SHA-2) family of hash algorithms. The SHA256 is a SHA-2 hash algorithm that has eight 32-bit words. While the SHA256 hash and checksum functions are described above any hash and checksum function may be used to produce the authentication key 125 and authentication checksum 126 and they may be produced in a different manner without departing from the disclosure.

Once the authentication key 125 and authentication checksum 126 are produced by the processor 110 performing the key and checksum producing operation 114, they are stored in the memory 120. When the processor 110 receives an interaction request 134 from the initiating device 140A and/or the receiving device 140B, the processor 110 performs a data extracting operation 112 on the interaction request 134, to extract such information as the identification, network address, machine identification number, or internet address of the initiating device 140A and the receiving device 140B. The data extraction operation 112 also extracts at least one numerical value related to the proposed interaction 152, such as a transaction value, or an identification or values related to third party devices that are involved in the interaction 152. The data extracted by the operation 112 is not limited to the above-described data and may be any kind of data that is needed or useful to produce the verification key 115 and verification checksum 116 and should be the same information/data extracted to produce the authentication key 125 and authentication checksum 126 as described above.

Once the processor 110 performing the data extracting operation 112 extracts all the data needed from the interaction request 134, the processor 110 performs the key and checksum producing operation 114 using the information extracted in the data extracting operation 112. The processor 110 retrieves the appropriate hash and checksum algorithms 124 from memory 120 and applies them to the data extracted by the data extracting operation 112. In one embodiment the key and checksum producing operation 114 includes performing a SHA256 hash function to produce the verification key 115 and a SHA256 checksum function to produce the verification checksum 116. The specific function for producing the verification key 115 and checksum 116 should be the same as that used to produce the authentication key 125 and authentication checksum 126 but is not limited to the SHA256 hash and checksum functions.

Once the verification key 115 and verification checksum 116 are produced by the processor 110 performing the key and checksum producing operation 114, they are used by the processor 110 performing the comparison operation 118. In the comparison operation 118, the processor 110 retrieves the authentication key 125 and authentication checksum 126 from the memory 120 and compares it to the verification key 115 and verification checksum 116 produced by the processor 110 from the interaction request 134. If both the authentication key 125 and verification key 115 are the same (have the same value) and the authentication checksum 126 and verification checksum 116 are the same (also have the same value), the processor 110, when performing the comparison operation 118, determines that the interaction 152 is valid and sends to the initiating device 140A and receiving device 140B a response to validation 138 indicating that the interaction 152 is valid. If the authentication key 125 and verification key 115 have a different value and/or and the authentication checksum 126 and verification checksum 116 have a different value, the processor 110 when performing the comparison operation 118 determines that the interaction 152 is invalid and sends a response to validation 138 indicating that the interaction 152 is invalid.

Memory

Memory 120 may be any type of storage for storing a computer program comprising instructions 122, authentication key 125 and authentication checksum 126, and hash and checksum algorithms 124. The memory 120 may be a non-transitory computer-readable medium that is in operative communication with the processor 110. The memory 120 may be one or more disks, tape drives, or solid-state drives. Alternatively, or in addition, the memory 120 may be one or more cloud storage devices. The memory 120 may also be used as an over-flow data storage device, to store applications when such applications are selected for execution, and to store instructions 122 and data that are read during the execution of the applications. The memory 120 may be volatile or non-volatile and may comprise read-only memory (ROM), random-access memory (RAM), ternary content-addressable memory (TCAM), dynamic random-access memory (DRAM), and static random-access memory (SRAM).

Figure 2:
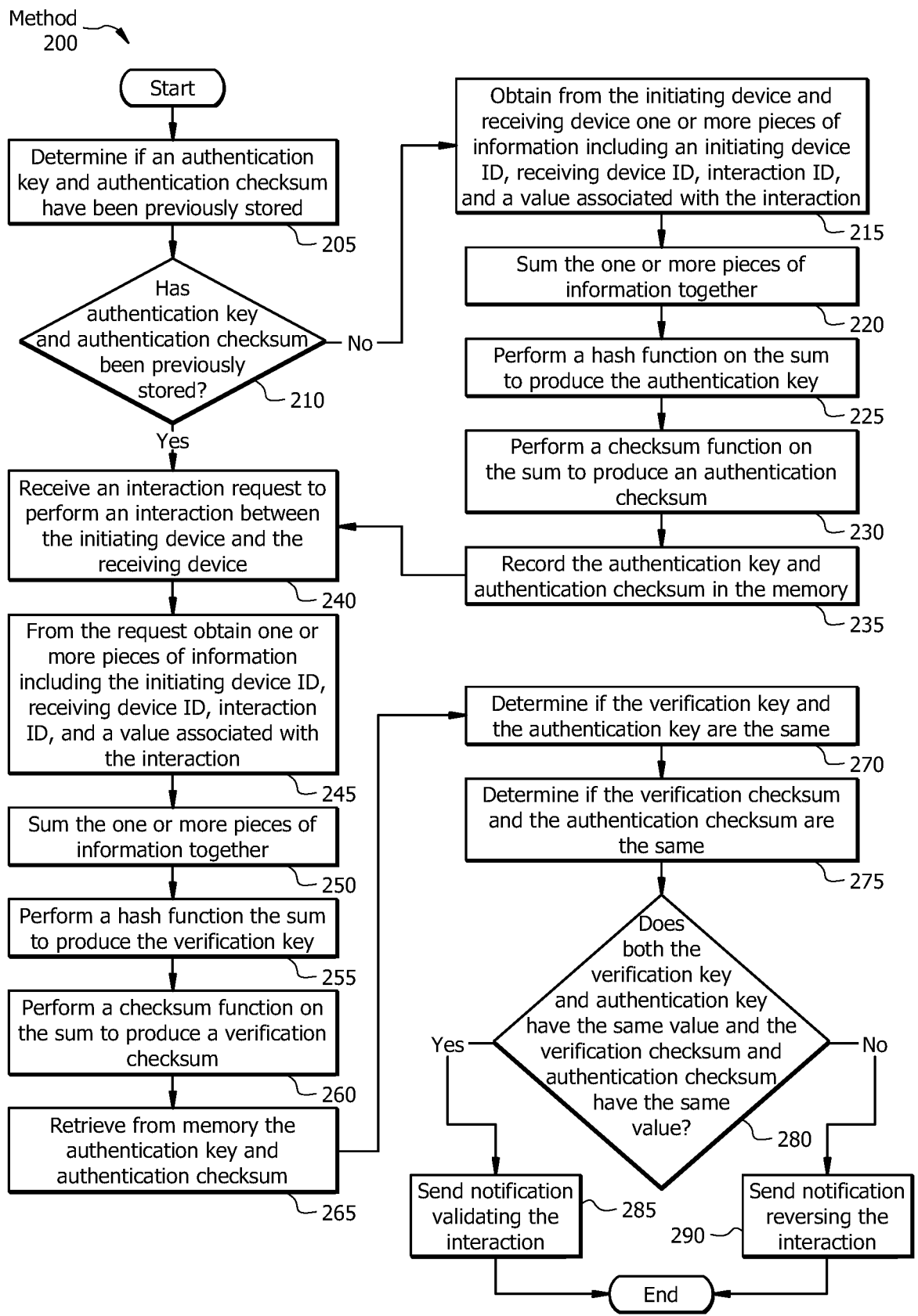
FIG. 2 illustrates one embodiment of a method of validating an interaction.

The memory 120 stores instructions 122 that when executed by the processor 110, causes the processor 110 to perform the operations that are described in FIGS. 1 and 2. The instructions 122 may comprise any suitable set of instructions, logic, rules, or code. The memory 120 may include storage that takes the form of a database for storing one or more authentication key 125 and authentication checksum 126 as well as hash and checksum algorithms 124 and these may be stored and recalled using known protocols such as SQL, XML, and/or any other protocol or language that a user, administrator, or developer of the system 100 wishes to use.

Interaction Validation Process

FIG. 2 is a flowchart of an embodiment of a method 200 for performing a validation of an interaction 152 by a processor 110. The processor 110 may execute instructions 122 stored in the memory 120, that employ the method 200 for validating the interaction 152 between an initiating device 140A and receiving device 140B.

At operation 205, the processor 110 determines if an authentication key 125 and authentication checksum 126 have been previously stored in memory 120. This may be performed at any time or based on a request received from at least one of the initiating devices 140A and receiving device 140B.

In operation 210 the processor 110 makes the determination if the authentication key 125 and authentication checksum 126 has been previous stored, and if it they have been stored, the method proceeds to operation 240. If the authentication key 125 and authentication checksum 126 have not been previous stored in memory 120, the method proceeds to operation 215.

At operation 215, the processor 110 obtains from the initiating device 140A and receiving device 140B one or more pieces of information including an initiating device identification, receiving device identification, interaction identification, and a value associated with the interaction 152. The processor 110 in operation 215 may obtain more information than described, depending on what is needed for the performing a comparison operation 118 and verifying the interaction 152. The initiating device information 132 and receiving device information 136 may be sent to the processor 110 using encryption such as public-private key encryption. Alternatively, the initiating device information 132 and receiving device information 136 may be sent to the processor 110 without encryption or with other forms of encryption. Once the processor 110 receives the initiating device information 132 and receiving device information 136, the processor 110 performs a data extracting operation 112 to extract the one or more pieces of information.

Once the information is extracted by the processor 110 from the initiating device information 132 and receiving device information 136 in operation 215, the processor 110 performing the key and checksum producing operation 114 sums the one or more pieces of information together to produce a numerical value in operation 220. This numerical value is then hashed by the processor 110 in operation 225 performing the key and checksum producing operation 114 with the hash and checksum algorithms 124. In one embodiment the hash algorithm is a SHA-256 algorithm, however any hashing algorithm may be used without departing from the invention. The hashed summed information produced in operation 220 is used to produce an authentication key 125.

Similarly, the processor 110 performs a checksum function on the sum to produce an authentication checksum value in operation 230.

Once the authentication key 125 and authentication checksum 126 are produced in operations 225 and 230, the processor 110 stores the authentication key 125 and authentication checksum 126 in the memory 120. The method then waits until an interaction request 134 is received in operation 240 and/or proceeds to operation 240 if the interaction request 134 has already been received.

Once operation 235 is completed or an authentication key 125 and authentication checksum 126 is determined to have been previously stored in operation 210, the method proceeds to operation 240. In operation 240, the processor 110 receives an interaction request 134 from the initiating device 140A and/or the receiving device 140B. The processor 110 in operation 245 then performs the data extraction operation 112 on the interaction request 134.

In operation 245 the processor 110 extracts one or more pieces of information including the initiating device identification, receiving device identification, interaction identification, and a value associated with the interaction 152. The processor 110 extracts the one or more pieces of information from the interaction request 134 without decrypting the request. While the specific one or more pieces of information may change depending on the type of interaction 152 being authorized as well as other pertinent information, in general, the one or more pieces of information extracted in operation 245 should be the same as those obtained in operation 215.

Once the information is extracted from the interaction request 134, the method proceeds to operation 250 where the processor 110 performing the key and checksum producing operation 114 sums the one or more pieces of information together to produce a numerical value in operation 250.

The numerical value produced by summing the one or more pieces of information in 250 is used in operation 255 by the processor 110, which in operation 255 performs the key and checksum producing operation 114 with the hash and checksum algorithms 124. The result of applying the hash function is used to produce a verification key 115. Similar in operation 260 the processor 110 uses a checksum function on the sum to produce a verification checksum 116.

In operation 265 the authentication key 125 and authentication checksum 126 is obtained from memory 120 and then used in operation 270 by the processor 110 performing a comparison operation 118 to determine if the verification key 115 and authentication key 125 are the same, and in operation 275 the processor 110 performing the comparison operation 118 determines if the verification checksum 116 an authentication checksum 126 are the same.

Once the processor 110 completes operations 270 and 275, the method proceeds to operation 280. In operation 280 the processor 110 uses the determination made in operations 270 and 275 to determine the next operation to perform. If, in operation 270, the authentication key 125 is determined to have the same value as the verification key 115 and in operation 275 the authentication checksum 126 is determined to have the same value as the verification checksum 116, then the method proceeds from operation 280 to operation 285 where a response to validation 138 is sent to the initiating device 140A and receiving device 140B, notifying the initiating device 140A and receiving device 140B that the interaction 152 is valid.

If either the verification key 115 does not have the same value as the authentication key 125 or the verification checksum 116 does not have the same value as the authentication checksum 126 as determined in operations 270 and 275, at operation 280, the processor 110 proceeds to operation 290 where a response to validation 138 is sent to the initiating device 140A and receiving device 140B, notifying the initiating device 140A and receiving device 140B that the interaction 152 is invalid and/or the interaction 152 has been tampered with. The response to validation 138 that indicates that the interaction 152 is invalid also may include instructions to reverse the transaction. Once either operation 285 or 290 is completed the method of FIG. 2 ends.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 140 (f) as it exists on the date of filing hereof unless the words "means for" or "operation for" are explicitly used in the particular claim.

The invention claimed is:

1. A system for validating an interaction, the system comprising:
 a memory configured to store at least an authentication key and an authentication checksum value; and
 a processor operably coupled to the memory and configured to:
  receive a request to perform the interaction, wherein the interaction is an electronic interaction between an initiating device and a receiving device, and wherein the request is encrypted;
  extract, from the request, information comprising at least an initiating device identification, a receiving device identification, and one or more numerical values associated with the interaction;
  produce a verification key from the information by applying a hash function to a sum of the initiating device identification, the receiving device identification, and one or more numerical values;
  produce a verification checksum value from the information by applying a checksum function to a sum of the initiating device identification, the receiving device identification, and one or more numerical values;
  determine if the verification key and the authentication key have a same value;

determine if the verification checksum value and the authentication checksum value have a same value; and reverse the interaction when either the verification key does not have the same value as the authentication key, or the verification checksum value does not have the same value as the authentication checksum value.

2. The system of claim 1, wherein the processor validates the interaction when both the verification key has the same value as the authentication key and the verification checksum value has the same value as the authentication checksum value.

3. The system of claim 1, wherein the hash function is a SHA256 hash function.

4. The system of claim 1, wherein the checksum function is a SHA256 checksum function.

5. The system of claim 1, wherein the request is encrypted using homomorphic encryption and wherein the extracted information is extracted without decrypting the request.

6. The system of claim 1, wherein the authentication key and the authentication checksum value are produced prior to receiving the request to perform the interaction, and wherein the authentication key and authentication checksum value are determined using the extracted information which are received from the initiating device and receiving device prior to performing the interaction.

7. The system of claim 1, wherein one or more aspects of the interaction are stored in a blockchain.

8. A method for validating an interaction, comprising:
receiving a request to perform the interaction, wherein the interaction is an electronic interaction between an initiating device and a receiving device, and wherein the request is encrypted;
extracting, from the request, information comprising at least an initiating device identification, a receiving device identification, and one or more numerical values associated with the interaction;
producing a verification key from the information by applying a hash function to a sum of the initiating device identification, the receiving device identification, and one or more numerical values;
producing a verification checksum value from the information by applying a checksum function to a sum of the initiating device identification, the receiving device identification, and one or more numerical values;
determining if the verification key and an authentication key have a same value;
determining if the verification checksum value and an authentication checksum value have a same value; and
reversing the interaction when either the verification key does not have the same value as the authentication key, or the verification checksum value does not have the same value as the authentication checksum value.

9. The method of claim 8, further comprising validating the interaction when both the verification key has the same value as the authentication key and the verification checksum value has the same value as the authentication checksum value.

10. The method of claim 8, wherein the hash function is a SHA256 hash function.

11. The method of claim 8, wherein the checksum function is a SHA256 checksum function.

12. The method of claim 8, wherein the request is encrypted using homomorphic encryption and wherein the extracted information is extracted without decrypting the request.

13. The method of claim 8, wherein the authentication key and the authentication checksum value are produced prior to receiving the request to perform the interaction, and wherein the authentication key and authentication checksum value are determined using the extracted information which is received from the initiating device and receiving device prior to performing the interaction.

14. The method of claim 8, wherein one or more aspects of the interaction are stored in a blockchain.

15. A non-transitory computer-readable medium storing instructions that when executed by a processor cause the processor to:
receive a request to perform an interaction, wherein the interaction is an electronic interaction between an initiating device and a receiving device, and wherein the request is encrypted;
extract, from the request, information comprising at least an initiating device identification, a receiving device identification, and one or more numerical values associated with the interaction;
produce a verification key from the information by applying a hash function to a sum of the initiating device identification, the receiving device identification, and one or more numerical values;
produce a verification checksum value from the information by applying a checksum function to a sum of the initiating device identification, the receiving device identification, and one or more numerical values;
determine if the verification key and an authentication key have a same value;
determine if the verification checksum value and an authentication checksum value have a same value; and
reverse the interaction when either the verification key does not have the same value as the authentication key, or the verification checksum value does not have the same value as the authentication checksum value.

16. The non-transitory computer-readable medium of claim 15, wherein the instructions further cause the processor to validate the interaction when both the verification key has the same value as the authentication key and the verification checksum value has the same value as the authentication checksum value.

17. The non-transitory computer-readable medium of claim 15, wherein the hash function is a SHA256 hash function, and the checksum function is a SHA256 checksum function.

18. The non-transitory computer-readable medium of claim 15, wherein the request is encrypted using homomorphic encryption and wherein the extracted information is extracted without decrypting the request.

19. The non-transitory computer-readable medium of claim 15, wherein the authentication key and the authentication checksum value are produced prior to receiving the request to perform the interaction, and wherein the authentication key and the authentication checksum value are determined using extracted information which is received from the initiating device and receiving device prior to performing the interaction.

20. The non-transitory computer-readable medium of claim 15, wherein one or more aspects of the interaction are stored in a blockchain.

* * * * *